Patented July 12, 1938

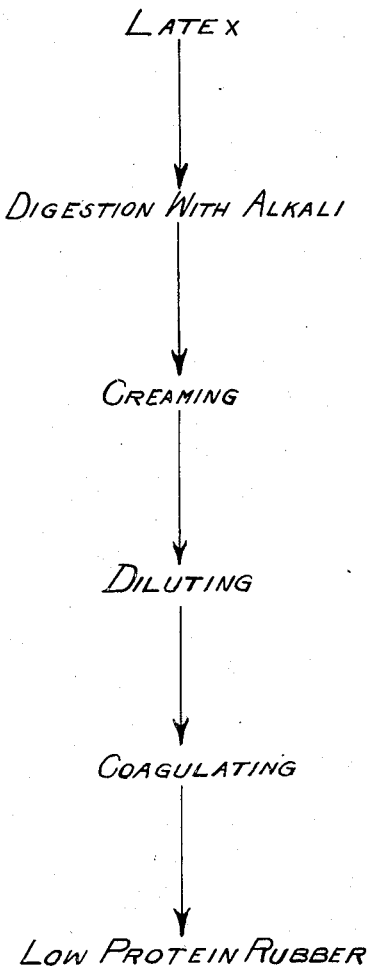

2,123,862

UNITED STATES PATENT OFFICE 2,123,862

TREATMENT OF LATEX

Walter T. L. Ten Broeck, Dolok Merangir, East Coast Sumatra, assignor to Wingfoot Corporation, Wilmington, Del., a corporation of Delaware Application July 6, 1936, Serial No. 89,118
In the Netherlands April 17, 1936

8 Claims. (Cl. 18—50)

This invention relates to the treatment of latex and the preparation of a rubber having low water absorption properties suitable for the insulation of submarine cables, etc. It includes both the method of treatment and the product obtained. Although the invention will be described more particularly in connection with the treatment of latex from Hevea brasiliensis it can also be applied to the treatment of latices of other hevea species and to gutta percha, balata, ficus elastica, etc.

According to this invention the latex is first subjected to treatment for the solubilization of nitrogenous material present in the latex. Caustic alkali will ordinarily be employed for this purpose. The latex is thereafter subjected to a treatment which separates it into two portions, one of which is richer in rubber constituents and relatively poorer in non-rubber constituents than the original latex and the other portion of which contains comparatively little rubber but contains the greater part or nearly all of the original non-rubber materials which are not desired in the final product. This separation may be effected by centrifuging or creaming. The concentrated and purified latex is diluted to obtain an emulsion of low dry rubber content and this is coagulated and washed to remove water-soluble materials formed during coagulation as well as residual water soluble materials which remain in the concentrate after the purification process. The product is then dried by any of the usual methods. The resulting rubber is a non-tacky rubber. It contains a small amount of nitrogenous matter which probably includes natural antioxidants which prevent the rubber from becoming tacky. It has a low water absorption preferably not greater than 0.01 gram per square inch.

The treatment of latex with alkali to solubilize nitrogenous material is known in the art. It is described in German Patent 460,950. The preferred method comprises treating the latex with 10–20 grams of sodium hydroxide per kilogram of latex at an elevated temperature, preferably about 60° C. for several days, for example four days. The amount of caustic employed may be varied and the time and temperature may likewise be varied. With sufficient alkali room temperature may be employed for the digestion. The digestion may be carried out under pressure if desired. In certain instances it may be desirable to add an emulsifier such as soap to the alkali before digestion of the latex. Although sodium hydroxide is the preferred reagent for the alkali digestion other alkali materials may be used such as potassium hydroxide, ammonium hydroxide, carbonates and phosphates of the alkali metals, etc. Solubilization of nitrogenous materials present in the latex may likewise be accomplished by suitable treatment with enzymes such as papain, trypsin, etc.

After the digestion is complete the latex may be neutralized with an acid such as hydrochloric acid if the solubilization has been effected with alkali. Partial neutralization will generally be desirable. A stabilizer may then be added.

After the solubilization of the nitrogenous material the latex may be diluted with water before purification. If the purification is to be effected by creaming this will ordinarily be desirable. If the purification is to be effected by centrifuging the concentration of the latex will indicate whether or not it is desirable to dilute before centrifuging. If the purification is effected by creaming a single creaming operation is all that will ordinarily be required. If a centrifuge is employed for purification it will ordinarily be desirable to centrifuge at least two times, diluting with water between each centrifuging operation.

If a centrifuge is employed for the purification it will be preferable to concentrate to a dry rubber content of at least 50% in each centrifuging operation. The process may be carried out as follows:

Natural latex as obtained from the trees is treated with ten grams of sodium hydroxide per kilogram of latex and is heated at 60° C. for 72 hours. Following this the latex is passed through a centrifugal concentrating machine and the concentrated portion is removed and fresh water is added to reduce the rubber content to approximately 30%. This operation is repeated twice making three passes of latex through the centrifuge. After this the latex is diluted by the addition of water to approximately 1% dry rubber content. Sufficient coagulant such as formic acid is added to recover the rubber from the suspending medium. The rubber thus obtained is passed through creping machines of the usual type with running water until a thin sheet suitable for drying is obtained. The drying may be carried out in any desired manner.

The following table gives results obtained from a certain fresh latex by treatment as above described.

| Times centrifuged | Water absorption grams/in$^2$ |
|---|---|
| 0 | 0.010 |
| 1 | .007 |
| 2 | .006 |
| 3 | .005 |
| 4 | .004 |

The water absorption is determined by immersing a 4" by 1" sample of the rubber in a closed bottle of distilled water for 20 hours at 70° C., wiping dry with a linen or other cloth which is free from lint and weighing immediately. The difference in weight before and after immersion determines the water absorption. The sample for the water absorption test is prepared by pressing sufficient dry crepe in a steel frame .08 inch thick between aluminum sheets in a steam heated press at a temperature of 215° F. for 30 minutes. After removal from the press the rubber assumes a thickness of about 2.25 millimeters.

If the concentration is to be effected by creaming it is desirable to dilute with water after solubilization of the nitrogen containing materials. This accomplishes several beneficial results. First, latices after heating with 15-20 grams sodium hydroxide per liter of latex upon cooling (or after long heating) become very thick and express a small amount of brown rubber-free serum. Dilution with water stops this tendency toward creaming and increases the effectiveness of the ordinary creaming agents. Second, by dilution the alkali content is reduced to such a concentration that it is more suitable for creaming than the higher concentrations. (10-20 grams of sodium hydroxide per kilogram of latex is desired for protein digestion; 3 to 4 grams of sodium hydroxide per kilogram of latex is approximately the amount preferred for the creaming of fresh latex.) Third, creaming of latex of normal dry rubber content (30-40%) results in cream and serum layers approximately equal in volume. By diluting with water the volume of the serum layer is increased and the concentration of soluble impurities is thus reduced thereby reducing the amount of soluble materials which remain in the serum and the cream layer.

The usual creaming agents can be used such as for example konnyaku meal (the meal from amorphallus bulbs), gum tragacanth, Iceland moss, etc. Those materials effective as creaming agents in low concentrations are preferred because of the smaller amount of water absorbing or water soluble material thereby added to the latex. Where it is desirable to reduce the alkali content of the latex by neutralization with acid after digestion and before creaming, it may be desirable to use any known stabilizer to prevent coagulation of the rubber. The most effective stabilizers are those soluble in both alkaline and acid solutions, such as sulphonic esters of higher alcohols, etc.

The latex may be creamed for a longer or shorter time. Elevated temperatures may be employed. When heat-decomposable creaming agents are employed the cream may be heated before coagulation so as to decompose any residual creaming agent which is deleterious to the desired water absorption properties of the resulting rubber. Ordinarily a sufficiently pure rubber will be obtained without resorting to such heating.

The invention will be further illustrated by the following examples:

*Example 1.*—15.0 kg. of fresh latex was digested for four days at 55° C. with 1500 cc. sodium hydroxide solution (5 cc. equals 1 gram NaOH). 45 kg. of water was added. This was allowed to cream for two days using as a creaming agent 72 grams of a 1% aqueous dispersion of konnyaku meal (meal from amorphallus bulbs). This yielded 10 kg. of cream of 48.5% dry rubber content. The cream was diluted with water to 1% dry rubber content and coagulated with 58 cc. 0.4% formic acid for one liter diluted latex. The coagulum was creped under a plentiful supply of water to a final thickness of 1 to 1.5 millimeters. A flow sheet of one general method of procedure is shown in the drawing. The rubber was dried in a circulating hot air oven at a temperature below 50° C. Air drying at normal temperatures may be used. The water absorption was found to be 0.0043. The nitrogen content was 0.031%.

*Example 2*—Other latex was similarly treated as indicated in the following table, using potassium cocoanut oil soap as an emulsifier in the creaming step.

| | | |
|---|---|---|
| Latex | kgs | 15.0 |
| Sodium hydroxide solution (5 cc. 1 gram NaOH) 4 days at 50-68° C | cc | 750 |
| Water | kgs | 22.5 |
| Potassum cocoanut oil soap solution (3 cc. 1 gm. cocoanut oil) | cc | 1340 |
| Konnyaku meal, in 1% aqueous dispersion | gms | 48 |
| Creaming period | days | 2 |

The latex was treated with the alkali, diluted and then creamed. This yielded 9.1 kg. of cream of 57.6% dry rubber content. This was coagulated, etc. as in Example 1. The rubber had a water absorption of 3.0 mg./sq. in. and a nitrogen content of 0.043%.

The water absorption of normal rubber will run from about 15 to 20 mg/sq. in. or more, and the nitrogen content will be about 0.4%.

After concentrating by creaming or centrifuging it is essential to dilute the concentrate with water before coagulating. It is preferable to dilute to a dry rubber content of not more than 5%.

Compounding materials such as coagulation accelerators, fillers, anti-oxidants, etc., may be added as desired before coagulation. The materials may be either soluble in alkaline solution such as soaps and precipitated upon acid addition, or the materials may be dispersed and merely carried down with the rubber upon coagulation, or insoluble materials may be used which will be loosely held by the coagulum and then mixed during washing and creping of the rubber.

Although the invention has been described more particularly for the treatment of fresh latex as it comes from the trees the process is not limited to such treatment as it includes not only the treatment of natural latices but latices preserved with chemicals such as ammonia and latices which have been concentrated by evaporation, centrifuging, creaming, etc. Thus concentrated latex may be shipped to the country of use and be there subjected to the treatment herein described to produce a rubber having low water absorption properties.

I claim:

1. The method of treating latex which comprises subjecting the latex to treatment for the solubilization of nitrogenous material naturally present in the latex, purifying the latex by removal of aqueous serum containing dissolved water-soluble materials, diluting the concentrated latex, coagulating, washing and drying.

2. The method of treating latex which comprises subjecting the latex to treatment for the solubilization of nitrogenous material naturally present in the latex, diluting the latex, purifying the resulting latex by removing aqueous serum containing dissolved water-soluble materials, and then diluting, coagulating, washing and drying.

3. The process of claim 1 in which fresh latex is treated.

4. The process of claim 1 in which a concentrated latex is treated.

5. The process of claim 1 in which the concentrated latex is diluted to a dry rubber content of not more than 5% before coagulating.

6. The method of treating a fresh latex of Hevea brasiliensis which comprises heating the latex with caustic alkali for several days at about 60° C., diluting the treated latex, subjecting the diluted latex to a single creaming operation, diluting the creamed product to a dry rubber content of not more than about 5% and then coagulating.

7. The method of treating a fresh latex of Hevea brasiliensis which comprises heating the latex with caustic alkali at a temperature of about 60° C. for several days, removing water-soluble materials from the resulting product by repeated centrifuging with dilution of the concentrate between each centrifugation, diluting the resulting concentrate to a latex with a dry rubber content of not more than about 5% and then coagulating.

8. In the method of obtaining low protein from latex which has been treated for the solubilization of nitrogenous material naturally present in the latex and then purified by removal of aqueous serum containing dissolved water-soluble materials, the steps which comprise diluting the purified product to a dry rubber content of not more than about 5% and then coagulating.

WALTER T. L. TEN BROECK.